May 6, 1958     A. KIPNIS     2,833,204
PASTRY COOKING MACHINE
Filed Nov. 20, 1953
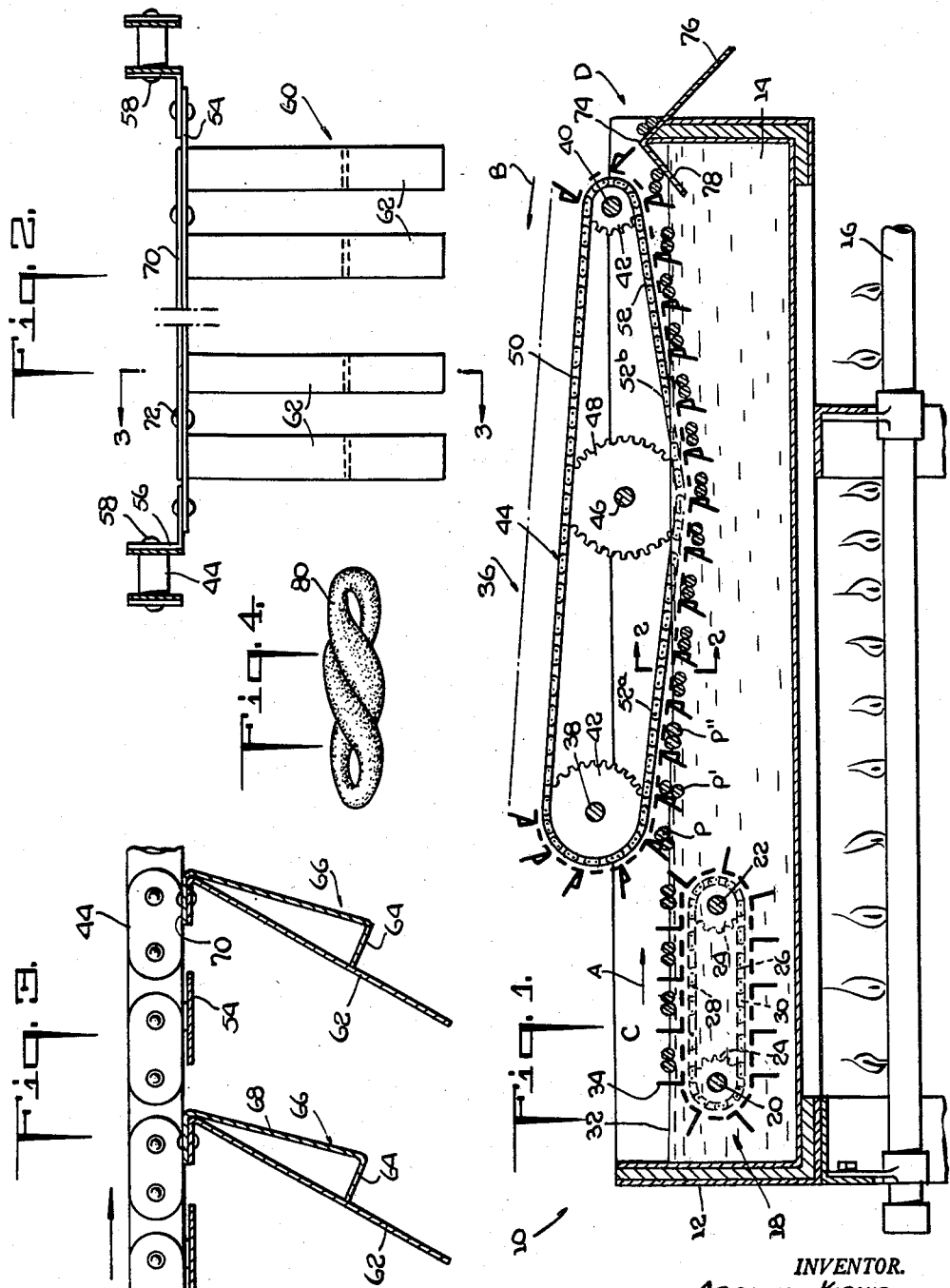
INVENTOR.
ABRAHAM KIPNIS
BY
ATTORNEY United States Patent Office 2,833,204
Patented May 6, 1958

2,833,204

PASTRY COOKING MACHINE

Abraham Kipnis, Forest Hills, N. Y.

Application November 20, 1953, Serial No. 393,445

3 Claims. (Cl. 99—405)

This invention relates to a pastry cooking machine.

One of the aspects of my invention pertains to a method and apparatus for making pastries with greater uniformity and symmetry by deep fat cooking.

Heretofore in typical machines of such nature, as exemplified by my United States Letters Patent No. 2,463,112 issued March 1, 1949 for Twisted Cruller Machine, it has been customary to deposit the soft—i. e., uncooked—pastry, shaped in some suitable form, in a tank of hot fat or the like. The floating pastry was propelled through the fat as its submerged underside was cooked. Thereafter, the pastry was completely submerged and its movement through the tank continued, to cook its upper half. This method, although resulting in a substantially uniform degree of cooking over the upper and lower surfaces of the pastry, was objectionable in that the means which held the pastry submerged left its mark on the initially soft top thereof. Moreover, absolute uniformity of cooking was not achieved inasmuch as the girth of the pastry was cooked longer than any other part. In addition I have found that cooking the top part simply by submerging the pastry without turning the same did not permit the pastry to expand sufficiently.

It is accordingly an object of my invention to provide a machine which overcomes the foregoing drawbacks; has a novel mechanism for turning over pastry whose lower half has been cooked; includes a means of the character described that is particularly simple in operation and requires no additional kinematic mechanisms; constitutes extremely few and simple parts; and can be readily and easily added to the apparatus shown in my aforesaid Letters Patent.

It is an ancillary object of my invention to provide a mechanism of the character described which utilizes a force generated by the floating pastry itself to help turn the pastry over.

Another aspect of my invention is concerned with the mechanism for discharging cooked pastry from the fat tank, and it is an object thereof to provide a particularly simple discharging means having no moving parts other than the conveyor mechanism that propels pastries through the tank and which, therefore, is rugged and efficient in operation.

Other objects of my invention will in part be obvious and in part will be pointed out hereinafter.

My invention accordingly consists in the features of construction, combinations of elements, arrangements of parts and series of steps which will be exemplified in the machine and method hereinafter described and of which the scope of application will be indicated in the appended claims.

In the accompanying drawings, in which is shown one of the various possible embodiments of my invention, Fig. 1 is a vertical sectional view of an illustrative apparatus constructed in accordance with the present invention;

Fig. 2 is an enlarged fragmentary sectional view taken substantially along the line 2—2 of Fig. 1;

Fig. 3 is a fragmentary sectional view taken substantially along the line 3—3 of Fig. 2; and Fig. 4 is a plan view of a cooked and twisted cruller stick of a type which can be fried in the apparatus embodying the present invention.

Referring now in detail to the drawings, the reference numeral 10 denotes a machine of the type shown, described and claimed in my aforesaid Letters Patent. Essentially said machine includes a tank 12 containing a bath 14 of deep fat. The tank is suitably heated, as by gas burners 16. A means, not shown herein but fully illustrated and described in said Letters Patent, is employed to drop soft uncooked pastries, shaped in some suitable form, in succession in the deep fat at one end of the tank.

A first conveyor mechanism propels the pastries from the drop zone C toward but not to a discharge zone D. Said mechanism is arranged to propel the pastries while they float on top of the deep fat so that the submerged underportions of the pastries exposed to the high temperature of the fat will be cooked. To this end said first conveyor mechanism may be located beneath the floating pastries.

As is well known, the portions of pastries, such, for example, as crullers, so cooked will expand, forming hollow chambers therein which increase the buoyancy and displacement of the lower part of the pastry.

Although any suitable type of first conveyor mechanism which will propel floating fried pastries can be employed in the first cooking stage, I prefer to use a mechanism of the type shown in my aforesaid Letters Patent. For such purpose I provide a pair of parallel shafts 20, 22, which are submerged in the fat. One of the shafts—e. g., the shaft 20—is located near the drop zone for the uncooked pastries and the other shaft 22 is spaced from said first shaft 20 in direction toward the discharge zone. Each shaft 20, 22 is provided with a pair of spaced sprocket wheels 24, one such wheel on each shaft being registered with a companion wheel on the other shaft. A different chain 26 is trained about each pair of companion sprocket wheels. The two shafts lie in the same horizontal plane and all the sprocket wheels are of the same diameter so that each chain 26 has an upper flight 28 and a lower flight 30. One of the shafts 20, 22 is driven from a suitable source of rotary power (not shown) in a direction such that the upper flights of the chains move in a direction up to and past the drop zone C, as indicated by the arrow A in Fig. 1. The level 32 of the fat in the tank is maintained somewhat above the upper flights of the chains for a reason which soon will be apparent.

Pushers 34 have their opposite ends secured to the chains 26. These pushers comprise a series of spaced parallel metal strips extending in a direction perpendicular to the chains and bridging the space therebetween. The pushers 34 project outwardly away from the chains, that is to say, when the pushers are located on the top flights of the chains they extend upwardly and when they are located on the bottom flights of the chains they extend downwardly. The space between any adjacent pair of pushers is sufficient to accommodate floating pastry. The pushers desirably extend close to the level of the fat 32 in the tank and preferably somewhat above said level to enable them to efficiently propel floating pastries through the tank.

The upper flights of the chains are long enough for the pastries to be cooked to the point that the submerged portions thereof swell and a crust is formed although not necessarily browned.

As the pastries are discharged from the first conveyor mechanism 18 they are fed to a second conveyor mechanism 36. Conveniently this is a mechanism of the overhead type and consists of a pair of horizontal shafts 38, 40 located above the fat in the tank. Said shafts are parallel to and spaced from one another. One of the shafts—e. g., the shaft 38—is located above and near the exit shaft 22 of the first conveyor mechanism 18. The other shaft 40 is located at the discharge zone D. The shafts 38, 40 mount pairs of spaced sprocket wheels 42. Companion sprockets on shafts 38, 40 are in registry and have chains 44 trained about the same. For a reason which later will be pointed out I prefer to have the sprocket wheels on the shaft 38 formed to a larger diameter than the sprocket wheels on the shaft 40. Both pairs of sprocket wheels are completely above the fat in the tank.

An idler shaft 46 is provided intermediate and parallel to the shafts 38, 40. Said idler shaft supports another pair of sprocket wheels 48 which are aligned with the sprocket wheels on the shafts 38, 40. The idler shaft is so located and its sprocket wheels 48 are of such diameter that the lower portions of said sprocket wheels are submerged in the fat. These portions of the wheels engage the chains 44 and direct them beneath the surface of the fat. It thus will be appreciated that the upper flights 50 of the chains 44 are completely clear of the fat and lower flights 52 of said chains constitute two sections 52a and 52b, the section 52a between the sprocket wheels and the shafts 38, 46 sloping downwardly into the fat and the section 52b between the sprocket wheels and the shafts 46, 40 sloping upwardly out of the fat.

The chains 44 are transversely interconnected by a plurality of flat thin narrow metal strips 54 suitably mounted at their opposite ends on said chains. For example, each strip has permanently and rigidly secured to its ends angle irons 56 which are fixed to chain pins 58. The angle irons are so oriented that the strips located on the outer side of the chains face outwardly, in other words, so that fhen they are on the upper flight the strips are uppermost, and when they are on the lower flight the strips are lowermost, this latter position being illustrated in Figs. 2 and 3.

One of the shafts 38, 40 is driven by a suitable source of rotary power (not shown) in a direction B such that the lower flight moves from the first conveyor mechanism 18 toward the discharge zone D.

As will be clear from the drawings, the strips 54 as they leave the sprocket wheels on the shaft 38 are above the level of the fat.

Certain of the strips 54 are provided with pushers 60 which extend outwardly away from the chains 44. As shown herein said pushers comprise a set of parallel slender fingers 62 (see Fig. 2) which are spaced from one another. When the fingers are on the upper flights they extend upwardly and when they are on the lower flights they extend downwardly. Said fingers conveniently may be formed in one piece with alternate strips 54. The fingers may be inclined—e. g., at an angle of about 30 degrees, from their bases to their tips—away from the direction of motion, as best seen in Fig. 3.

On the leading face of each of said fingers I provide a protuberance 64 extending forwardly (in the direction of motion) from said face. Said protuberance can be formed in any suitable manner. For example, it may constitute the lower leg of an L-shaped member 66 whose vertical leg 68 is integral at its upper end with a rearwardly extending transverse element 70 fixed, as by rivets 72, to the strip 54. Each member 66 is as wide as and in line with its associated finger 62.

The second conveyor mechanism is so timed in relation to the first that as a floating pastry is discharged from said first mechanism it will be picked up by a pusher 60 of the second mechanism.

Preferably, the protuberances 64 are spaced from the strips 54 a distance such that as a pusher 60 initiates its propelling movement of a pastry, the protuberances will be located above and spaced from such pastry which, at this time, is floating free on the surface of the fat. Hence the initial action of the pushers on the second conveyor simply is to continue propelling the pastries through the tank. In this respect the second conveyor mechanism does not differ from the corresponding second conveying mechanism disclosed in my aforesaid Letters Patent.

As has been pointed out above, the sections 52a of the chains 44 slant downwardly as the pushers thereon propel pastry forwardly. Therefore, after moving a floating pastry forward a short distance, the protuberances 64 will press down against the upper trailing edge of said pastry. The lowering of said edge of the forwardly moving pastry disturbs the pastry's stability to a point where the pastry reaches unstable equilibrium—i. e., its restoring stability moment becomes negative. Thereupon the pastry will tend to turn upside down in the fact. As this happens, the pastry will escape from beneath the protuberances 64.

In Fig. 1 the pastry P at the left hand side of the second conveyor mechanism is shown as its trailing edge is being initially depressed. The next pastry P' is illustrated in a further depressed position, as the pastry is about to turn upside down, and the third pastry P'' and all of the remaining pastries are shown after they have inverted.

The second conveyor mechanism is at a height such that an inverted pastry will float freely on the surface of the fat for a short distance before it is submerged, thus permitting free expansion of the soft dough portions of the pastry which has just been brought beneath the surface of the hot fat.

I believe that the instability of the pastry brought about by depressing its trailing edge is heightened because the portion thereof which initially was submerged is the only part that has expanded and the pastry at this time, therefore, consists of a heavy upper part and an enlarged light lower part so that its equilibrium is more easily rendered unstable. Moreover, the inverting of the pastry is believed to be aided by having the pastry propelled forwardly as it is being depressed so that the leading edge is pressed rearwardly by the fat. The pastry is held against the pushers by the forward movement of the lower flight of the overhead conveyor, this being encouraged by providing the pushers with spaces between the fingers which allow the pushers to move forward through the fat without creating any appreciable sidewise flow of the fat that otherwise might tend to displace the pastry.

After the pastries have been turned over, they are submerged so that both sides are exposed to the hot fat, and the pastry thereafter will be uniformly cooked except for the last few moments as it is permitted to refloat in the latter part of the section 52b when the cooking will be limited to the under part of the pastry.

It is pointed out that as the pastry is held submerged by the strips 54 said strips press against an already cooked and therefore set crust of the pastry and will not, accordingly, leave any marks thereon, the uncooked portion of the pastry at this time being lowermost.

From the foregoing it will be appreciated that the second conveying mechanism inverts the pastries by pressing down against one edge thereof, preferably the trailing edge, while the pastry is being moved forwardly. It will be understood, therefore, that the particular construction of the second conveyor has been described in detail by way of example only, and that other mechanical arrangements will function equally well, such for example as an overhead rotating wheel having radial pusher blades with protuberances thereon. The advantage of such a novel inverting mechanism resides in the simplicity of its parts and the absence of any complicated mechanism such as is presently used, for example, in the making of doughnuts, which lifts a pastry above the surface of the fat in order to turn the same.

The terminal shaft 40 of the second conveyor mechanism is, as was noted heretofore, located above the level of the hot fat. Moreover, it is higher than the upper end 74 of a gravity chute 76 at the discharge zone D of the machine 10. An upwardly sloping entraining plate has its entry edge located beneath the hot fat, said plate being spaced from the shaft 40 a distance sufficient to permit the plate to be cleared by the series of pushers 60. The end 74 of the gravity chute is located above the level of the fat in the tank.

As the pastries, which have been permitted to refloat toward the end of the sections 52b, approach the discharge zone D, they are slid upwardly along the entraining plate by the pushers. When a pastry reaches the entrance to the gravity chute, the pusher which is propelling the same is inclined downwardly in the same general direction as the gravity chute, whereby the pastry will slide off the pusher and into the chute without the aid of a positively operable ejecting mechanism.

It is to be observed that this simple and efficient discharge of pastries from the machine is due to the inclination of the pushers at the point of discharge. Such inclination can be secured simply by proper angular orientation of the pushers relative to the chains of the second conveyor mechanism. However, if the shaft 40 is at approximately the level of the entrance to the gravity chute the inclination of the pushers will have to be very substantial and it will be difficult to utilize the pushers for propelling pastries in the second conveyor mechanism. The necessary inclination of the pushers at the discharge zone also can be secured by sufficiently elevating the shaft 40 above the upper end 74 of the gravity chute, but this alone requires said shaft to be quite high. I have found that in practice the best results are secured by utilizing both arrangements—that is to say, by having the pushers inclined rearwardly away from the direction of movement and also by elevating the shaft 40.

As has been mentioned heretofore, the sprocket wheels on the shaft 40 have a diameter which is small in comparison to that of the sprocket wheels on the shaft 38. This causes the pushers to move rapidly and quickly to change their angular direction as they travel about the shaft 40 whereby to aid in disengaging the pastries from the pusher and help maintain a substantial inclination of the pushers at the time pastries are transferred to the discharge chute.

It will be understood that the term "pastry" as used herein refers to a buoyant pastry of the type which customarily is cooked in deep fat, such as the cruller 80 shown in Fig. 4. In general I have found my invention works to best advantage in connection with elongated pastries of the character described, but it is to be understood that the invention also is usable in connection with non-elongated pastries, as for example doughnuts.

It thus will be seen that I have provided a machine and method which achieve all the objects of my invention and are well adapted to meet the conditions of practical use.

As various possible embodiments might be made of the above invention, and as various changes might be made in the embodiment above set forth, it is to be understood that all matter herein described, or shown in the accompanying drawings, is to be interpreted as illustrative and not in a limiting sense.

Having thus described my invention, I claim as new and desire to secure by Letters Patent:

1. A pastry cooking machine comprising a tank for containing a bath of hot fat, and a conveyor mechanism including a pusher, means to move said pusher forwardly and downwardly, said pusher being arranged to propel a buoyant pastry through the bath, the under portion of the pastry having been cooked and thereby swelled, an element associated with the pusher for submerging the pastry as the same is propelled by the pusher, and another element associated with the pusher for gradually depressing the trailing edge only of the pastry as it is propelled and before the pastry has been submerged, whereby as the pastry is tilted the heavier upper part of the pastry will cause the pastry to turn over while the pastry still is floating.

2. A pastry cooking machine as set forth in claim 1 wherein the means for gradually depressing the trailing edge of the pastry comprises a protuberance on the pusher.

3. A pastry cooking machine comprising a tank for containing a bath of hot fat, an endless conveyor, a pusher carried by said conveyor and extending away from the same, said conveyor having an upper flight and a lower flight, said lower flight including two contiguous sections, the first section sloping downwardly and the second section sloping upwardly, the end of the first section and the beginning of the second section being below the surface of the bath, said pusher having a protuberance spaced from the conveyor which gradually depresses the trailing edge only of a buoyant pastry propelled through the bath by the pushers, the under portion of the pastry having been cooked and thereby swelled, whereby as the pastry is tilted the heavier upper part of the pastry will cause the pastry to turn over while the pastry still is floating.

References Cited in the file of this patent

UNITED STATES PATENTS

| | | |
|---|---|---|
| 1,368,351 | Purrington | Feb. 15, 1921 |
| 2,047,262 | Gibson et al. | July 17, 1936 |
| 2,319,561 | Scharsch | May 18, 1943 |
| 2,463,112 | Kipnis | Mar. 1, 1949 |